US011449264B2

United States Patent
Strong

(10) Patent No.: US 11,449,264 B2
(45) Date of Patent: Sep. 20, 2022

(54) SECURELY ARMING A MEMORY DEVICE FOR SELF-DESTRUCTION BY IMPLEMENTING A SELF-DESTRUCTION COUNTDOWN TIMER USING A BATTERY BACKED REAL-TIME CLOCK

(71) Applicant: Micron Technology, Inc., Boise, ID (US)

(72) Inventor: Robert W. Strong, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/930,963

(22) Filed: May 13, 2020

(65) Prior Publication Data
US 2021/0357144 A1 Nov. 18, 2021

(51) Int. Cl.
*G06F 3/00* (2006.01)
*G06F 3/06* (2006.01)
*G06F 1/14* (2006.01)
*H04L 9/08* (2006.01)
*G06F 21/57* (2013.01)

(52) U.S. Cl.
CPC .............. *G06F 3/0652* (2013.01); *G06F 1/14* (2013.01); *G06F 3/0604* (2013.01); *G06F 21/57* (2013.01); *H04L 9/0825* (2013.01); *G06F 3/0679* (2013.01)

(58) Field of Classification Search
CPC ........ G06F 3/0652; G06F 1/14; G06F 3/0604; G06F 21/57; H04L 9/0825
See application file for complete search history.

(56) References Cited

U.S. PATENT DOCUMENTS

| | | | | |
|---|---|---|---|---|
| 7,493,654 | B2 * | 2/2009 | Bantz | G06F 21/50 713/187 |
| 9,172,380 | B2 * | 10/2015 | Kwon | G06F 21/76 |
| 9,952,809 | B2 * | 4/2018 | Shah | G06F 3/067 |
| 2016/0277393 | A1 * | 9/2016 | Fan | H04L 9/32 |

* cited by examiner

*Primary Examiner* — Tammara R Peyton
(74) *Attorney, Agent, or Firm* — Schwegman Lundberg & Woessner, P.A.

(57) ABSTRACT

A processing device receives a command to arm a memory device for self-destruction. In response to the command, a self-destruction countdown timer is commenced. An expiry of the self-destruction countdown timer and based on detecting the expiry of the self-destruction countdown timer, data stored by the memory device is destructed.

20 Claims, 7 Drawing Sheets

SECURELY ARMING A MEMORY DEVICE FOR SELF-DESTRUCTION BY IMPLEMENTING A SELF-DESTRUCTION COUNTDOWN TIMER USING A BATTERY BACKED REAL-TIME CLOCK

TECHNICAL FIELD

Embodiments of the disclosure relate generally to memory sub-systems and, more specifically, to securely arming a memory device for self-destruction.

BACKGROUND

A memory sub-system can include one or more memory devices that store data. The memory components can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
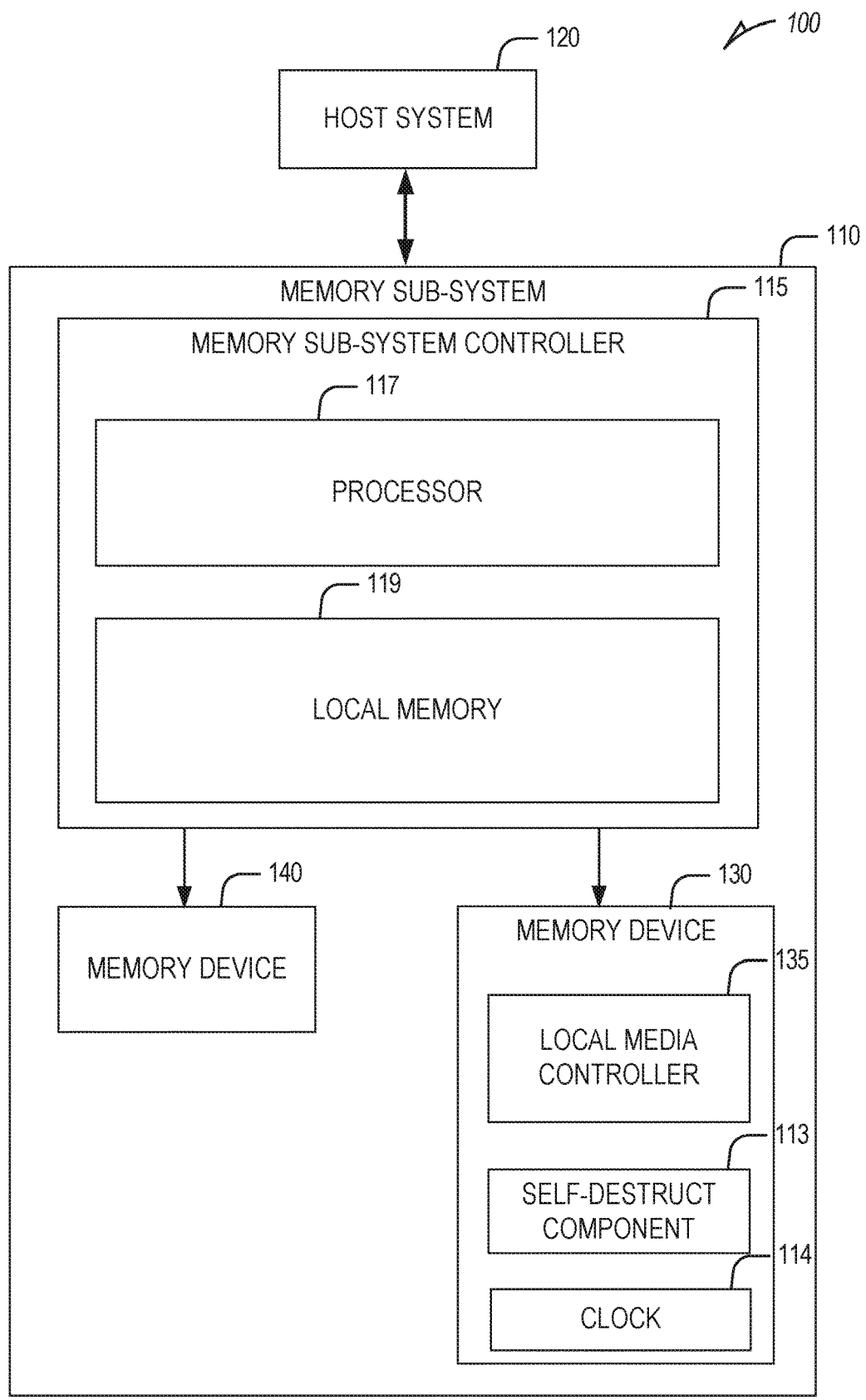
FIG. 1 illustrates an example computing system that includes a memory sub-system, in accordance with some embodiments of the present disclosure.

Aspects of the present disclosure are directed to securely arming a memory device in a memory sub-system for self-destruction. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device. Other examples of non-volatile memory devices are described below in conjunction with FIG. 1. Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

A memory device within a memory sub-system may store confidential, proprietary, or other sensitive information that should only be accessed by specifically authorized users. A memory device may be password protected to protect sensitive information stored thereon. However, loss of such a storage device (e.g., theft or accidental misplacement) can nonetheless be concerning for certain enterprises (e.g., military or intelligence community) given the sensitivity of the stored information. For example, while password protection can provide assurances of data at rest protection, given enough time and resources an entity (e.g., a nation state) could successfully breach the security countermeasures implemented on the memory device.

Aspects of the present disclosure address the above and other issues by implementing a self-destruct mechanism within memory devices. In an initial phase, a memory device is armed for self-destruction in response to a self-destruction command received from a host system. In response to receiving the self-destruction command, a self-destruction component of the memory device commences a self-destruction countdown timer. The self-destruction countdown timer can be implemented with a battery backed real-time clock included with the memory device or through tracking an internal clock signal provided by the storage device ASIC. The self-destruction countdown timer measures the time between receiving the command and self-destruction of the memory device. The time can be specified in the command or a default time can be used. At the expiry of the self-destruction countdown timer, data stored by the memory device is destroyed. For example, user data can be physically or cryptographically erased, firmware of the memory device can be destroyed, or a combination of both can be performed. If an abort command is received from the host system by the memory device prior to expiry of the self-destruction countdown timer, the self-destruction component aborts the self-destruction process and the timer is stopped and reset.

Consistent with some embodiments, an additional security layer can be added to the self-destruction mechanism. For example, a password can be required for commands to arm or disarm a memory device for self-destruction. As another example, an incoming command can include a security token that is digitally signed with a first cryptographic key using a cryptographic algorithm (e.g., Rivest, Shamir, and Adelman (RSA)) and the memory device can verify the security token using a second cryptographic key provisioned to the device.

The self-destruction mechanism for memory devices described herein reduces vulnerabilities in a memory sub-system by preventing access of sensitive information by unauthorized parties that can occur if the memory devices is lost or stolen even if the unauthorized parties have sufficient time and resources to breach conventional security countermeasures for memory devices. Traditional memory sub-systems often support password re-tries enforcement. That is, if a password is re-entered incorrectly a specified number of consecutive times (e.g., 5), then a power cycle of the memory sub-system is required. This protection rationale assumes that the power cycle requirement makes a brute force password guessing attack more difficult and time consuming, but not necessarily impossible. The self-destruction mechanism described herein can be used to improve and augment the re-tries mitigation by arming a memory device for self-destruction after a threshold number of password retries.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UPS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a host interface 102. Examples of a host interface 102 include, but are not limited to, a serial advanced technology attachment (SATA) interface, a peripheral component interconnect express (PCIe) interface, USB interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The host interface 102 can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The host interface 102 can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 and convert responses associated with the memory devices 130 and/or the memory device 140 into information for the host system 120.

In some embodiments, the memory devices 130 include local media controller 135 that operate in conjunction with memory sub-system controller 115 to execute operations on one or more memory cells of the memory devices 130.

The memory sub-system 110 also includes a self-destruction component 113 that facilitates arming the memory device 130 for self-destruction. Once the memory device 130 is armed for self-destruction, commands directed to the memory device 130 may be rejected with the exception of a command used to abort the self-destruction of the memory device 130.

In some embodiments, the memory sub-system controller 115 includes at least a portion of the self-destruction component 113. For example, the memory sub-system controller 115 can include a processor 117 (processing device) configured to execute instructions stored in local memory 119 for performing the operations described herein. In some embodiments, the self-destruction component 113 is part of the host system 120, an application, or an operating system.

In some embodiments, the local media controller 135 includes at least a portion of the self-destruction component 113.

As shown, the memory sub-system 110 also includes a clock 114 that is in communication with the self-destruction component 113 In some embodiments, the clock 114 can be part of the self-destruction component 113. The self-destruction component 113 uses the clock to implement a self-destruction countdown timer that measure a time between receiving a command to arm the memory device 130 for self-destruction and the actual self-destruction of the memory device 130. The clock 114 can include a battery backed real-time clock or an application-specific integrated circuit (ASIC) of the memory device 130. Further details with regards to the operations of the self-destruction component 113 are described below.

Figure 2A:
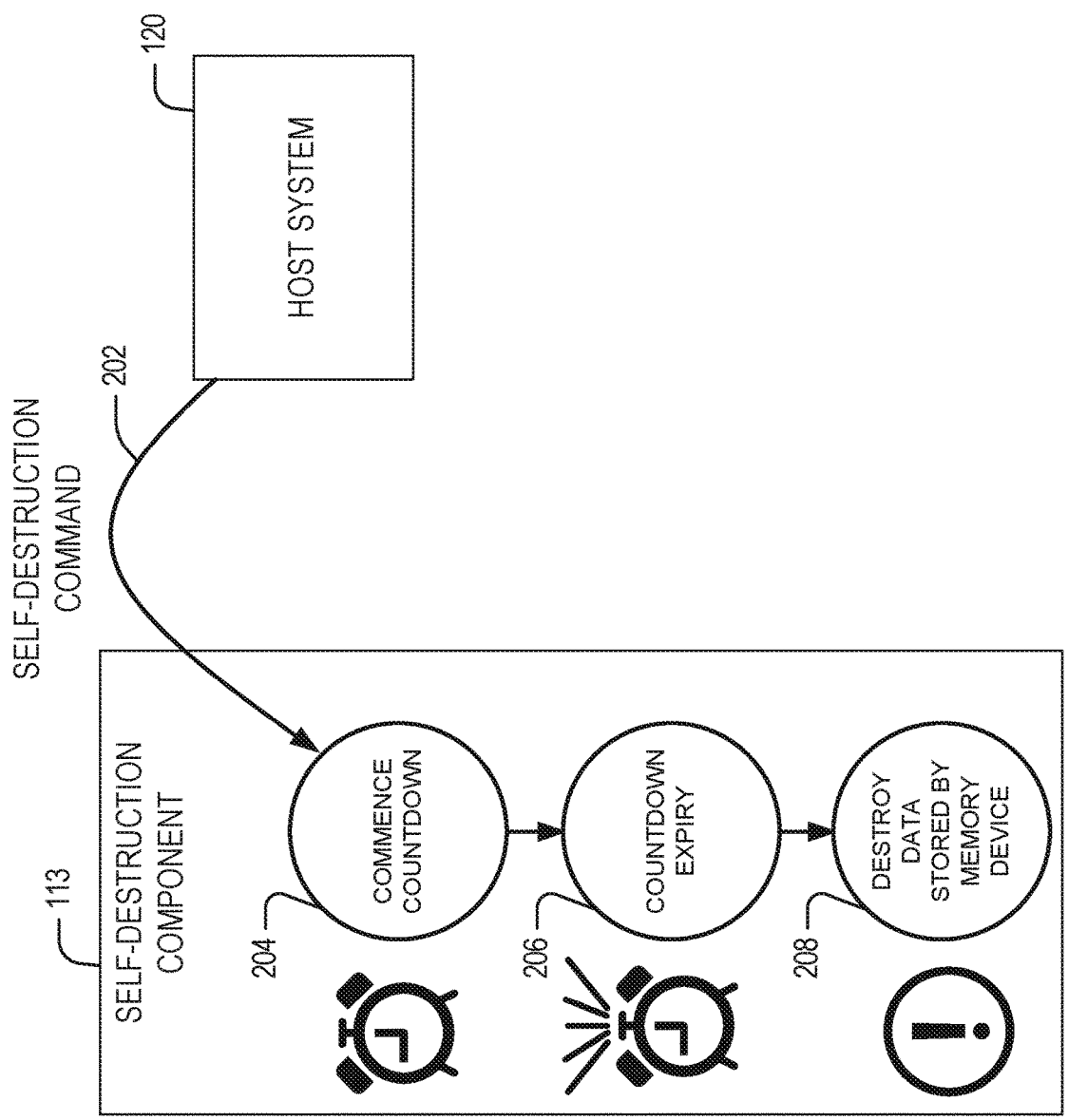
FIGS. 2A, 2B, and 2C is a data flow diagram illustrating interactions between components in a secure communication environment in arming and disarming a memory device for self-destruction, in accordance with some embodiments of the present disclosure.

FIG. 2A is a data flow diagram illustrating interactions between components in a secure communication environment in performing an example method for securely arming a memory device for self-destruction, in accordance with some embodiments of the present disclosure.

As shown, at 202, the self-destruction component 113 receives a command to arm the memory device 130 for self-destruction. The command can, in some embodiments, include a specified time period for a self-destruction countdown timer. For example, in some embodiments, a user may specify the time period. In some embodiments, the specified time period is a factory provisioned default value (e.g., if a user does not specify the time period or if a user is not allowed to specify a time period).

The self-destruction component 113 arms the device for self-destruction and commences the self-destruction countdown timer based on receiving the command (at 204). The self-destruction component 113 can, in some embodiments, include a battery backed real-time clock that provides a clock signal that the self-destruction component 113 can utilize to implement the self-destruction timer. In other embodiments, the self-destruction component 113 can utilize a clock signal provide by an internal clock of the memory device 130 to implement the self-destruction countdown timer.

At 206, the self-destruction component 113 detects expiry of the self-destruction countdown timer (e.g., after the user specified time period has elapsed) and based on the expiry of the self-destruction countdown timer, the self-destruction component 113 destroys data stored by the memory device 130 (at 208). In destroying the data, the self-destruction component 113 can erase user data (e.g., a physical or cryptographic erase), destroy the firmware on the memory device 130, or a combination of both. Consistent with some embodiments, the manner of data destruction can be specified in the command to arm the memory device 130.

Figure 2B:
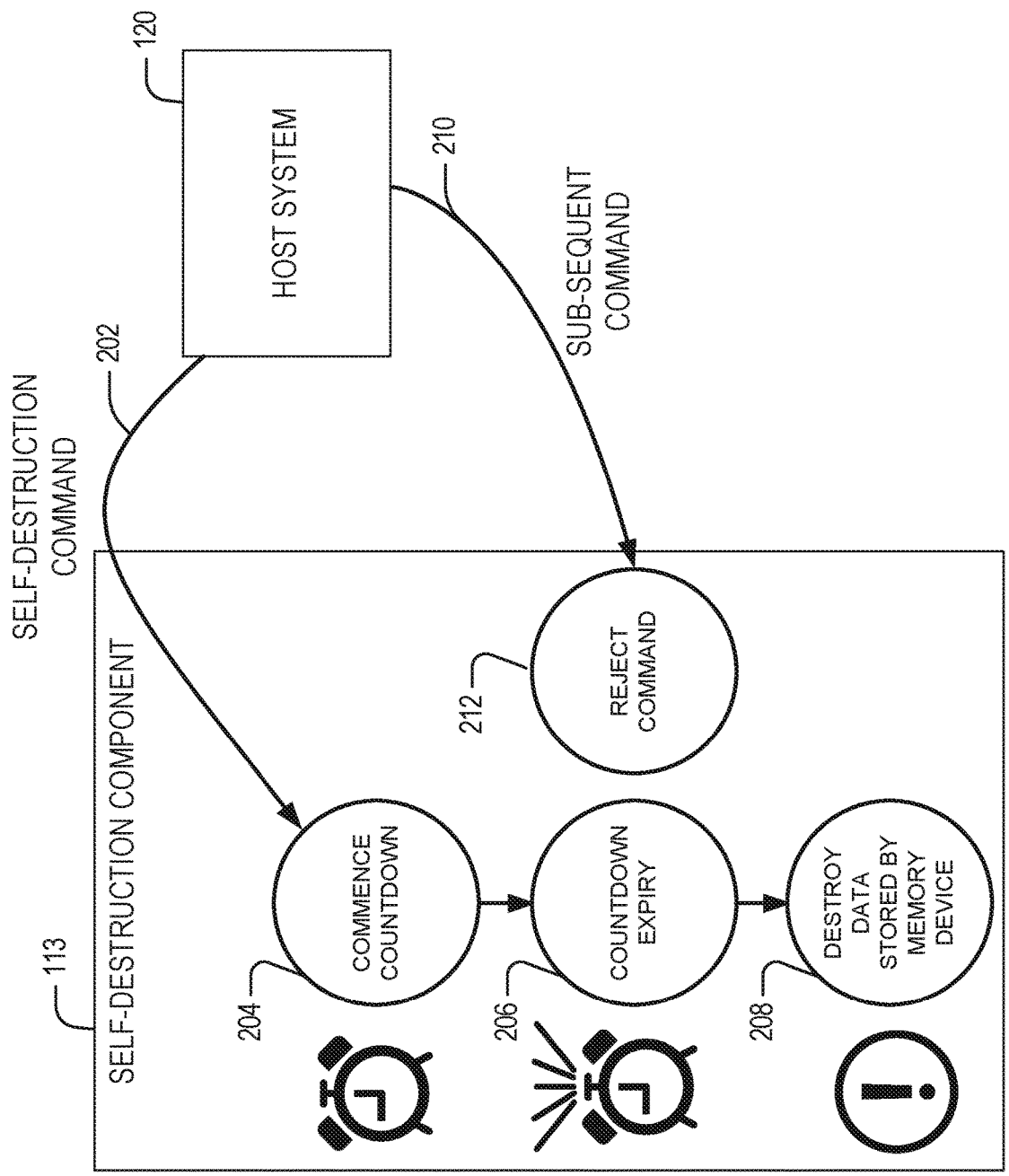

While the memory device 130 is armed for self-destructions, commands directed at the memory device 130 may be rejected. For example, with reference to FIG. 2B, at 210, a command is provided to the memory device 130 by the host system 120 while the memory device 130 is armed for self-destruction, and at 212 the self-destruction component 113 rejects the command because the device is armed for self-destruction.

Figure 2C:
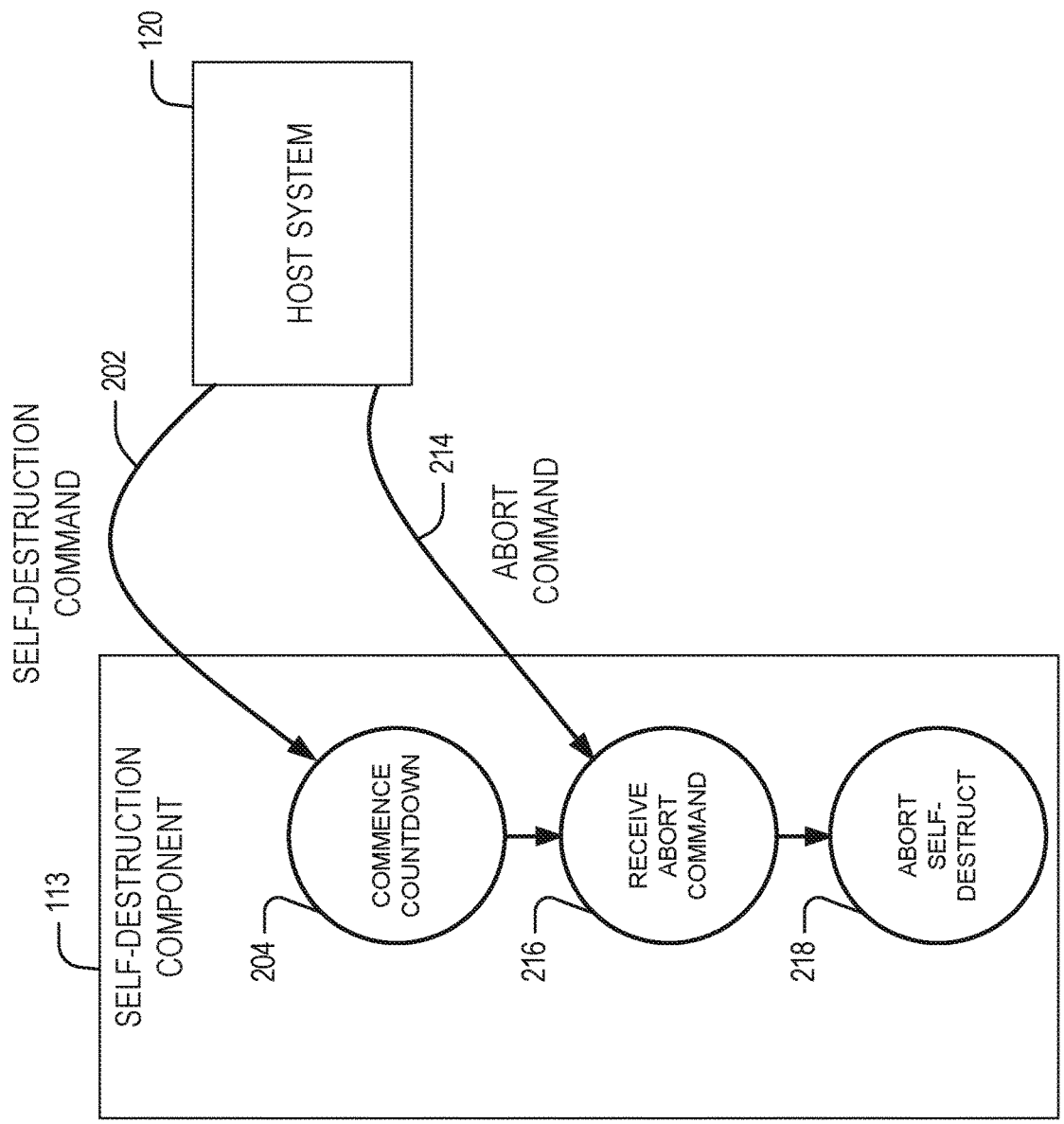

As an exception, an abort command can be used to disarm the memory device 130. For example, as shown in FIG. 2C, prior to expiry of the self-destruction countdown tinier, the host system 120 can send a second command to the self-destruction component 113 to abort the self-destruction of the memory device 130 (at 214). Based on receiving the abort command (at 216), the self-destruction countdown component 113 aborts the self-destruction of the memory device 130, at 218.

Consistent with some embodiments, an additional security layer can be added to the self-destruction processes described herein. For example, an asymmetric key pair—a public key and a private key—may be pre-generated, and the self-destruction component 113 may be provisioned with the public key, while the host system 120 or other secure environment is provisioned with the private key. The public key can be used by the self-destruction component 113 to verify that commands related to self-destruction of the memory device 130 are received from a trusted source. For example, the command to arm the memory device 130 can include a security token that includes a digital signature generated with the private key using a known cryptographic algorithm (e.g., RSA) and the self-destruction component 113 may verify the digital signature of the security token with the public key using the same cryptographic algorithm prior to commencing the self-destruction countdown timer. As another example, the command to abort the self-destruction of the memory device 130 can also include security token with a digital signature generated with the private key using a known cryptographic algorithm (e.g., RSA) and the self-destruction component 113 may verify the digital signature with the public key using the same cryptographic algorithm prior to aborting the self-destruction of the memory device 130.

Consistent with some embodiments, the self-destruction process utilizes a password scheme whereby a user is required to provide a valid password as a condition for successful arming and disarming of the memory device 130. In these embodiments, the self-destruction component 113 supports a mechanism that a user can invoke to establish a secret password for arming and disarming the memory device 130.

Figure 3:
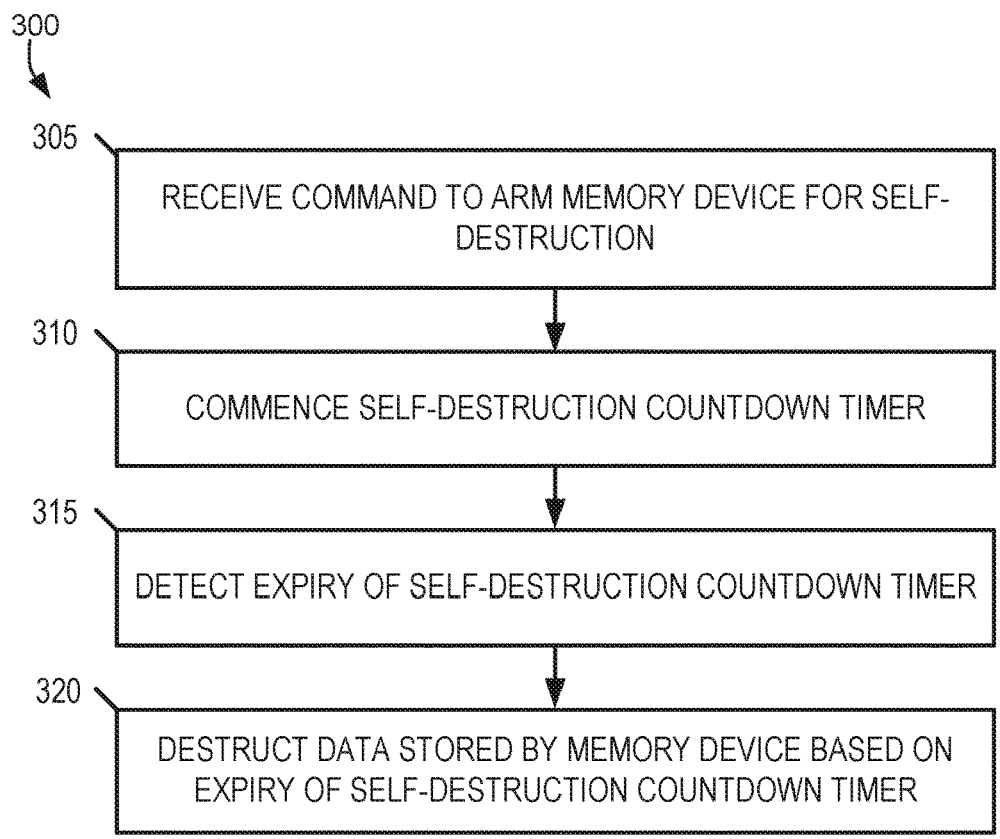
FIG. 3 is a flow diagram illustrating an example method for securely arming a memory device for self-destruction, in accordance with some embodiments of the present disclosure.

FIG. 3 is a flow diagram illustrating an example method 300 for securely arming a memory device for self-destruction, in accordance with some embodiments of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the self-destruction component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device receives a command to arm a memory device (e.g., the memory device 130) for self-destruction. Consistent with some embodiments, the command can include a specified time for a self-destruction countdown timer. The specified time may be a user specified time or a default value. The granularity of the user specified time can, for example, be in months, weeks, days, hours, minutes, or seconds.

In some embodiments, the command can further specify a manner of self-destruction. For example, the command can specify that user data is to be physically or cryptographically erased, that firmware of the device is to be destroyed, or a combination of both.

In some embodiments, the command is received from a host system (e.g., host system 120) via a host interface system. In some embodiments, the command is received from the host system via a communication port (e.g., a UART port or other serial communication port that supports two-way communication such as SMBus, I2C, or I3C). The command can be a vendor specific command or may be implemented using a replay protected memory block scheme. Consistent with some embodiments, the command can be supplied along with a password or digitally signed token to ensure that the command originated from a trusted source.

The processing device arms the memory device for self-destruction based on the command. While armed for self-destruction, additional commands directed to the memory device may be rejected by the processing device with the exception of an abort command, which can be used to abort the self-destruction of the memory device and is discussed in further detail below. In arming the memory device for self-destruction, the processing device, at operation 310, commences a self-destruction countdown timer based on receiving the command. The self-destruction countdown time can be set based on a user specified time specified in the command or can be set based on a default time, if a time is not specified.

In some embodiments, the processing device can include or be in communication with a battery backed real time clock and the processing device can use a clock signal provided by the battery backed real time clock in commencing the self-destruction countdown. In some embodiments, the processing device may use a clock signal provided by an internal clock of the memory device (e.g., an ASIC). Consistent with these embodiments, the processing device can utilize the host system internal clock to track a total elapsed time since (e.g., by counting clock ticks) receiving the command while the host system has been powered on. That is, if the memory device is power cycled or in a low power state, the self-destruction countdown timer continues where it left off prior to the power interruption.

As noted above, in some embodiments, a password is provided along with the command, and prior to arming the memory device and commencing the self-destruction countdown timer, the processing device verifies the password.

In some embodiments, the command can include a digitally signed security token and the processing device may verify the security token before commencing the self-destruction countdown timer. For example, the security token may be digitally signed using a first asymmetric cryptographic key provisioned to the host system using one of several known cryptographic algorithms (e.g., RSA), The processing device may be provisioned with a second asymmetric cryptographic key that can be used to verify the security token using the same cryptographic algorithm used to generate the digital signature.

At operation 315, the processing device detects expiry of the self-destruction countdown timer. That is, the processing device determines based on the self-destruction countdown time that the default or user specified time has elapsed since receiving the command.

At operation 320, the processing device destructs data stored by the memory device based on expiry of the self-destruction countdown timer. The destructing of the data stored by the memory device includes destroying user data stored by the memory device, destroying the memory device's firmware, or a combination of both. In destroying user data stored by the memory device, the processing device can physically or cryptographically erase the user data. The manner of self-destruction may be based on the command. For example, as noted above, the command can specify the manner of self-destruction.

The manner of physical erasure can vary depending on the type of memory device. For example, in embodiments in which a non-volatile memory device such as NAND type flash memory is being physically erased, the processing device performs a block erase in which the erase operation is performed on a block-by-block basis. That is, the processing device erases data from the memory device by changing the state of memory cells, blocks at a time. More specifically, on a per-block basis, the processing devices change the state of memory cells to "1."

In example embodiments in which the memory device is a self-encrypting memory device, the processing device can cryptographically erased stored user data. For example, a self-encrypting device uses one or more symmetric encryption keys to encrypt data stored by the device. By erasing the one or more symmetric encryption keys, the stored encrypted user data is effectively impossible to decrypt. Thus, the stored user data is rendered unrecoverable when the encryption key used to encrypt the user data is destroyed.

In embodiments in which the processing device destroys the memory device's firmware, the processing device erases the firmware from the memory device. For example, the firmware may be stored in static memory component (e.g., SRAM) of the memory device and upon physically erasing the firmware from the static memory component, the memory device is unbootable. In some embodiments, the firmware can he encrypted using a symmetric encryption key stored by the memory device, and the processing device can destroy the firmware by erasing the symmetric encryption key.

In some embodiments, the memory device can support recovery options that allow data to be recovered from the memory device even despite user data or firmware being destroyed. For example, a ROM component of the memory device can store data that can be used to recover the device. Consistent with these embodiments, the processing device can provide disable these recovery options to ensure that destroyed data is not recovered. Whether the processing device disables the recovery options can be based on the command to arm the device for self-destruction. For example, the command can specify whether recovery options for the memory device are to be disabled.

Figure 4:
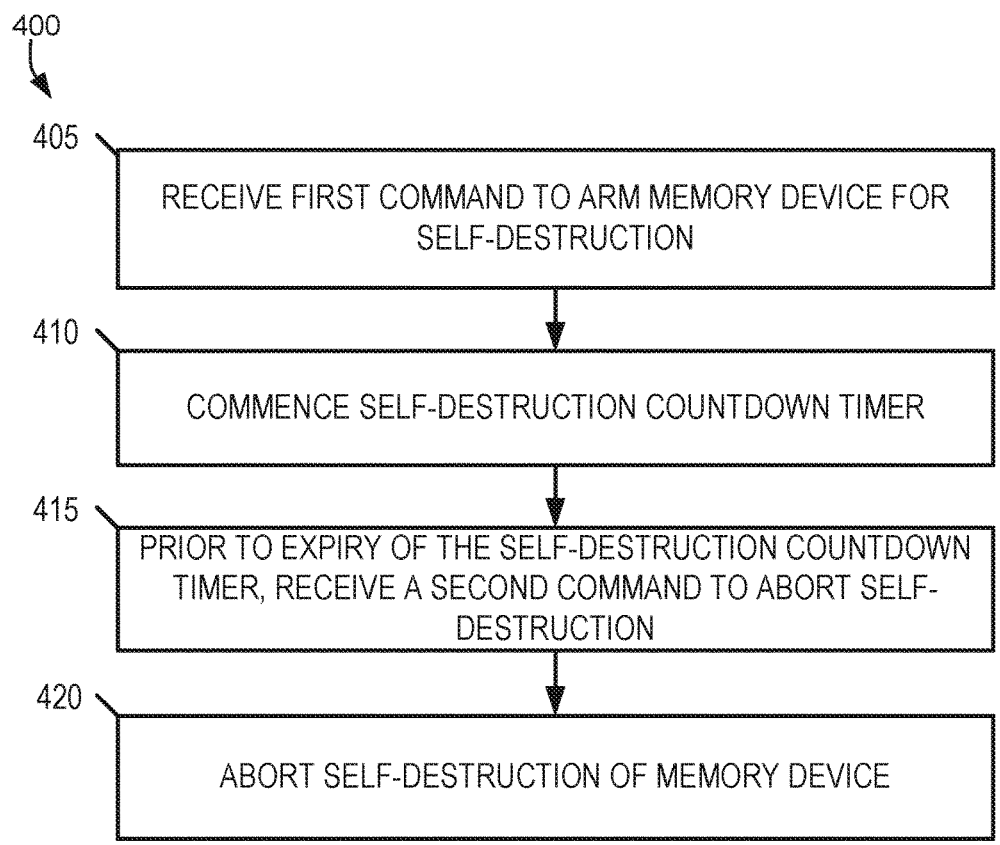
FIG. 4 is a flow diagram illustrating an example method for securely disarming a memory device that is armed for self-destruction, in accordance with some embodiments of the present disclosure.

FIG. 4 is a flow diagram illustrating an example method 400 for securely disarming a memory device that is armed for self-destruction, in accordance with some embodiments of the present disclosure. The method 300 can he performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the self-destruction component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device receives a first command to arm a memory device (e.g., the memory device 130) for self-destruction. Consistent with some embodiments, the command can include a user specified time for a self-destruction countdown timer. In some embodiments, the command is received from the host system 120 via a host interface system. In some embodiments, the command is received from the host system 120 via a communication port (e.g., a UART port or other serial communication port that supports two-way communication).

At operation 410, the processing device commences a self-destruction countdown timer based on receiving the command. The self-destruction countdown timer can be set based on a user specified time specified in the command or can be set based on a default time, if a time is not specified. In some embodiments, the first command can include a first digital signature and the processing device may verify the first digital signature before commencing the self-destruction countdown timer.

At operation 415, the processing device receives a second command to abort the self-destruction of the memory device. The second command is received prior to expiry of the self-destruction countdown. Consistent with some embodiments, a password can be supplied with the second command to ensure that the command originated from a trusted source.

At operation 420, the processing device aborts the self-destruction of the memory device. In aborting the self-destruction, the processing device stops and resets the self-destruction countdown timer. In some embodiments, the second command can include a digital signature and the processing device may verify the digital signature before aborting the self-destruction of the memory device. In some embodiments, a password is provided along with the command, and prior to aborting the self-destruction of the memory device, the processing device verifies the password.

EXAMPLES

Example 1 is memory sub-system comprising: a memory device; and a processing device, operatively coupled with the memory device, to perform operations comprising: receiving, from a host system, a command to arm the memory device for self-destruction; in response to the command, commencing a self-destruction countdown timer; detecting expiry of the self-destruction countdown timer; and based on detecting the expiry of the self-destruction countdown timer, destructing data stored by the memory device.

Example 2 includes the memory-subsystem of Example 1, wherein the command comprises a user specified time for the self-destruction countdown timer; and the expiry of the self-destruction countdown timer is based on the user specified time.

Example 3 includes the memory sub-systems of any one of Examples 1 or 2, and optionally further comprises a battery backed real time clock to provide a clock signal, wherein the processing device commences the self-destruction timer using clock signal provided by the battery backed real time clock.

Example 4 includes the memory sub-systems of any one of Examples 1-3, wherein the commencing of the self-destruction countdown timer comprises: tracking a total elapsed time since receiving the command using a clock signal provided by an internal clock of the host system.

Example 5 includes the memory sub-systems of any one of Examples 1-4, wherein the operations further comprise:

receiving a second command while the memory device is armed for self-destruction; and rejecting the second command based on the memory device being armed for self-destruction.

Example 6 includes the memory sub-systems of any one of Examples 1-5, wherein destructing the data stored by the memory device comprises one of: physically erasing user data stored by the memory device; or cryptographically erasing user data stored by the memory device.

Example 7 includes the memory sub-systems of any one of Examples 1-6, wherein destructing the data stored by the memory device comprises destroying firmware of the memory device.

Example 8 includes the memory sub-systems of any one of Examples 1-7, wherein: the command further comprises a digital signature generated using a first asymmetric cryptographic key; and the operations further comprising verifying the digital signature using a second asymmetric cryptographic key.

Example 9 is a method comprising: receiving, from a host system, a command to arm the memory device for self-destruction; in response to the command, commencing a self-destruction countdown timer; detecting expiry of the self-destruction countdown timer; and based on detecting the expiry of the self-destruction countdown timer, destructing data stored by the memory device.

Example 10 includes the method of Example 9, wherein the command comprises a user specified time for the self-destruction countdown timer; and the expiry of the self-destruction countdown timer is based on the user specified time.

Example 11 includes the method of any one of Examples 9 or 10, and optionally further comprises a battery backed real time clock to provide a clock signal, wherein the processing device commences the self-destruction timer using clock signal provided by the battery backed real time clock.

Example 12 includes the method of any one of Examples 9-11, wherein the commencing of the self-destruction countdown timer comprises: tracking a total elapsed time since receiving the command using a clock signal provided by an internal clock of the host system.

Example 13 includes the method of any one of Examples 9-12, wherein the operations further comprise: receiving a second command while the memory device is armed for self-destruction; and rejecting the second command based on the memory device being armed for self-destruction.

Example 14 includes the method of any one of Examples 9-13, wherein destructing the data stored by the memory device comprises one of: physically erasing user data stored by the memory device; or cryptographically erasing user data stored by the memory device.

Example 15 includes the method of any one of Examples 9-14, wherein destructing the data stored by the memory device comprises destroying firmware of the memory device.

Example 16 includes the method of any one of Examples 9-15, wherein: the command further comprises a digitally signed security token generated using a first asymmetric cryptographic key; and the operations further comprising verifying the digitally signed security token using a second asymmetric cryptographic key.

Example 17 is a non-transitory computer-readable storage medium comprising instructions that, when executed by a processing device, configure the processing device to perform operations comprising: receiving, from a host system, a first command to arm the memory device for self-destruction; in response to the command, commencing a self-destruction countdown timer; receiving, from the host system, a second command to abort the self-destruction of the memory device; and based on receiving the second command prior to expiry of the self-destruction countdown tinier, aborting the self-destruction of the memory device.

Example 18 includes the non-transitory computer-readable storage medium of Example 17, wherein the second command comprises a digitally signed security token generated using a first asymmetric cryptographic key; and the operations further comprising verifying the digitally signed security token using a second asymmetric cryptographic key before aborting the self-destruction of the memory device.

Example 19 includes the non-transitory computer-readable storage medium of any one of Examples 17 or 18 wherein the first command comprises a user specified time for the self-destruction countdown timer; the expiry of the self-destruction countdown timer is based on the user specified time.

Example 20 includes the non-transitory computer-readable storage medium of any one of Examples 17-19, wherein the processing device commences the self-destruction timer using a clock signal provided by one of: a battery backed real time clock or an internal clock of the host system.

Figure 5:
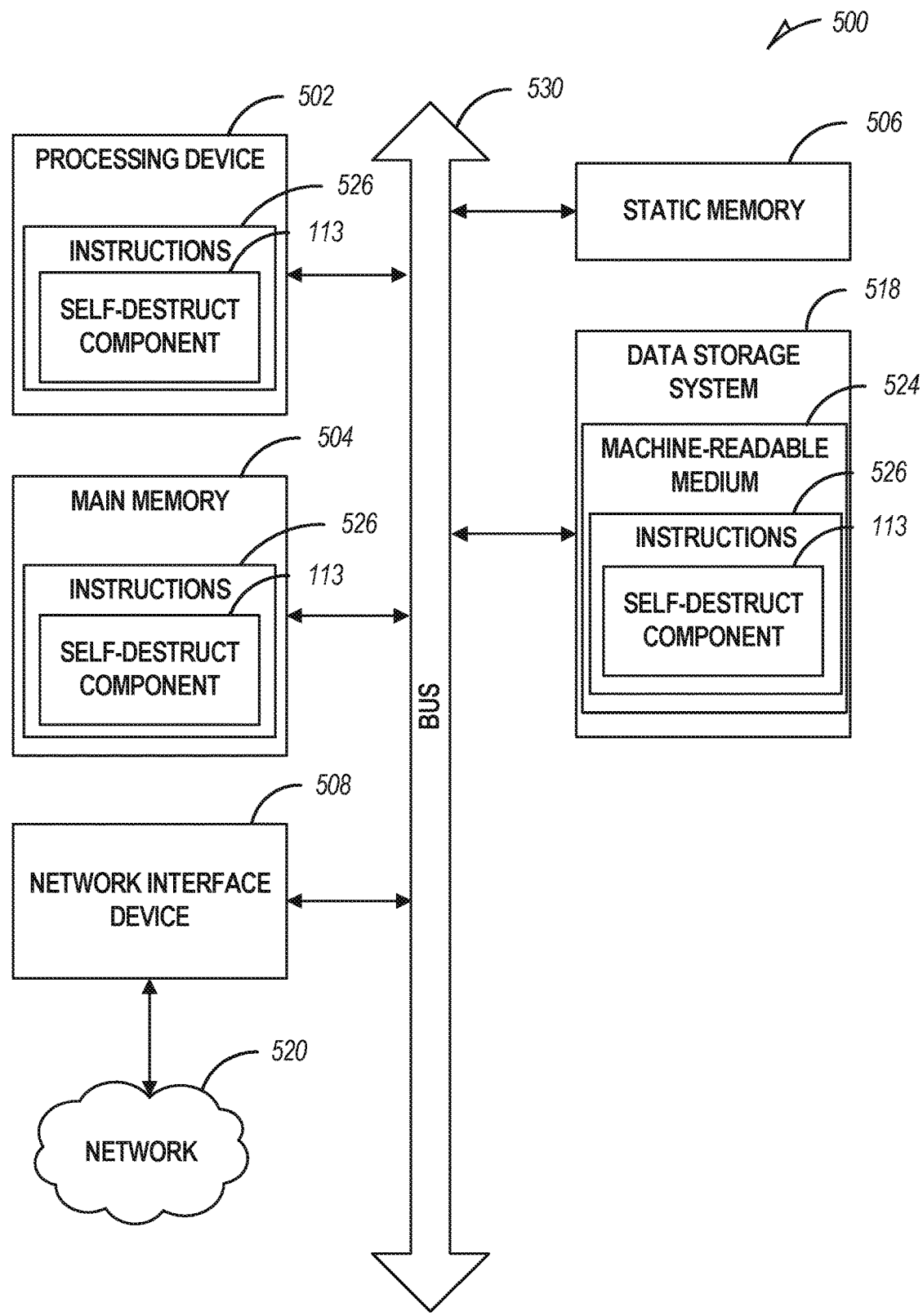
FIG. 5 is a block diagram of an example computer system in which embodiments of the present disclosure may operate.

FIG. 5 illustrates an example machine in the form of a computer system 500 within which a set of instructions can be executed for causing the machine to perform any one or more of the methodologies discussed herein. FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the self-destruction component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an ASIC, a FPGA, a digital signal processor (DSP), network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a self-destruction component (e.g., the self-destruction component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A memory sub-system comprising:
a memory device; and
a battery backed real time clock to provide a clock signal;
a processing device, operatively coupled with the memory device, to perform operations comprising:
receiving, from a host system, a command to arm the memory device for self-destruction;
in response to the command, commencing a self-destruction countdown timer using the clock signal provided by the battery backed real time clock;
detecting expiry of the self-destruction countdown timer; and
based on detecting the expiry of the self-destruction countdown timer, destructing data stored by the memory device.

2. The memory sub-system of claim 1, wherein:
the command comprises a user specified time for the self-destruction countdown timer;

the expiry of the self-destruction countdown timer is based on the user specified time.

3. The memory sub-system of claim 1, wherein the operations further comprise:
receiving a password along with the command; and
verifying the password prior to commencing the self-destruction countdown timer.

4. The memory sub-system of claim 1, wherein the commencing of the self-destruction countdown timer comprises:
tracking a total elapsed time since receiving the command using the clock signal.

5. The memory sub-system of claim 1, w herein the operations further comprise:
receiving a second command while the memory device is armed for self-destruction; and
rejecting the second command based on the memory device being armed for self-destruction.

6. The memory sub-system of claim 1, wherein destructing the data stored by the memory device comprises one of:
physically erasing user data stored by the memory device; or
cryptographically erasing user data stored by the memory device.

7. The memory sub-system of claim 1, wherein destructing the data stored by the memory device comprises:
destroying firmware of the memory device.

8. The memory sub-system of claim 1, wherein:
the command further comprises a digitally signed security token generated using a first asymmetric cryptographic key; and
the operations further comprising verifying the digitally signed security token using a second asymmetric cryptographic key.

9. A method comprising:
receiving, from a host system, a command to arm a memory device for self-destruction;
in response to the command, commencing, at the memory device, a self-destruction countdown timer using a clock signal provided by a battery backed real time clock;
detecting expiry of the self-destruction countdown timer; and
based on detecting the expiry of the self-destruction countdown timer, destructing data stored by the memory device.

10. The method of claim 9, wherein:
the command comprises a user specified time for the self-destruction countdown timer;
the expiry of the self-destruction countdown timer is based on the user specified time.

11. The method of claim 9, further comprising:
receiving a password along with the command; and
verifying the password prior to commencing the self-destruction countdown timer.

12. The method of claim 9, wherein the commencing of the self-destruction countdown timer comprises:
tracking a total elapsed time since receiving the command using the clock signal.

13. The method of claim 9, further comprising:
receiving a second command while the memory device is armed for self-destruction; and
rejecting the second command based on the memory device being armed for self-destruction.

14. The method of claim 9, wherein destructing the data stored by the memory device comprises one of:
physically erasing user data stored by the memory device; or
cryptographically erasing user data stored by the memory device.

15. The method of claim 9, wherein destructing the data stored by the memory device comprises:
destroying firmware of the memory device.

16. The method of claim 9,
wherein the command further comprises a digitally signed security token generated using a first asymmetric cryptographic key; and
further comprising verifying the digitally signed security token using a second asymmetric cryptographic key.

17. A non-transitory computer-readable storage medium comprising instructions that, when executed by a processing device, configure the processing device to perform operations comprising:
receiving, from a host system, a first command to arm a memory device for self-destruction;
in response to the command, commencing a self-destruction countdown timer using a clock signal provided by a battery backed real time clock;
receiving, from the host system, a second command to abort the self-destruction of the memory device; and
based on receiving the second command prior to expiry of the self-destruction countdown timer, aborting the self-destruction of the memory device.

18. The non-transitory computer-readable storage medium of claim 17, wherein
the second command comprises a digitally signed security token generated using a first asymmetric cryptographic key; and
the operations further comprising verifying the digitally signed security token using a second asymmetric cryptographic key before aborting the self-destruction of the memory device.

19. The non-transitory computer-readable storage medium of claim 17,
the first command comprises a user specified time for the self-destruction countdown timer;
the expiry of the self-destruction countdown timer is based on the user specified time.

20. The non-transitory computer-readable storage medium of claim 17, wherein the operations further comprise:
receiving a password along with the command; and
verifying the password prior to commencing the self-destruction countdown timer.

* * * * *